W. B. CAUSON.
REAR LIGHT SIGNAL FOR AUTOS.
APPLICATION FILED SEPT. 12, 1921.

1,402,479.  Patented Jan. 3, 1922.

INVENTOR
W. B. CAUSON
BY *Wright & Chum*
ATT'YS.

UNITED STATES PATENT OFFICE.

WILLIAM B. CAUSON, OF OAKLAND, CALIFORNIA.

REAR-LIGHT SIGNAL FOR AUTOS.

1,402,479. Specification of Letters Patent. Patented Jan. 3, 1922.

Application filed September 12, 1921. Serial No. 499,993.

*To all whom it may concern:*

Be it known that I, WILLIAM B. CAUSON, a citizen of the United States, residing at Oakland, in the county of Alameda and State of California, have invented new and useful Improvements in Rear-Light Signals for Autos, of which the following is a specification.

The present invention relates to improvements in automobile signals and resides particularly in the provision of a rear light signal which is adapted to be attached to some advantageous point such as the rear end of an automobile so that it will be visible at points at right angles to the automobile and its direction of travel and beyond right angles from which points it is not possible to view a red light such as customarily used on an automobile.

The primary object of the invention is to provide a rear light signal of the character described which will be simple as to construction, inexpensive and capable of being readily and easily attached to the license number plate at the rear end of an automobile, the said signal being so constructed and arranged that it will show a red light, which will be visible from various angles beyond the angles from which it is impossible to view the red light of an ordinary tail lamp of the type now in general use and in addition illuminate the license number in an effective manner.

A further object of the invention is to provide a combined tail light and license number illuminating device which will be more simple as to construction, consists of fewer parts than the ordinary type of tail light now in general use and which may be attached without the use of several brackets and other constructions, it only being necessary to secure by screws or other fastenings, the device to the license number plate.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings.

Figure 1:
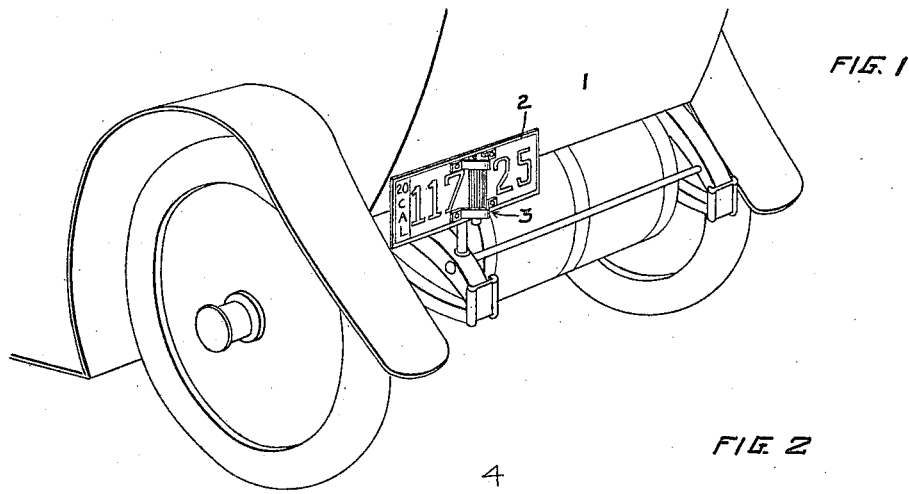
Fig. 1 is a fragmentary perspective view of the rear end of an automobile showing the device of my invention as it will appear when in use.
Figure 2:
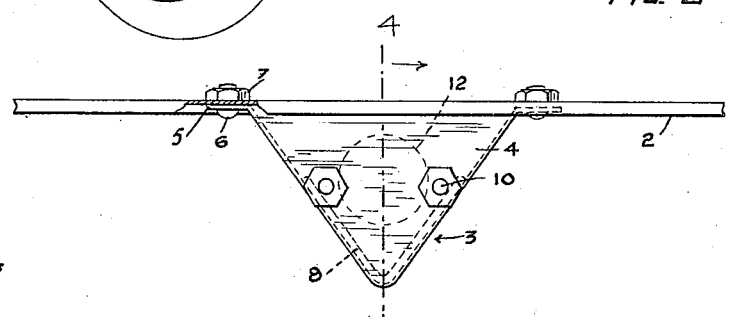
Fig. 2 is a top plan view of the invention shown in connection with the license number plate.
Figure 3:
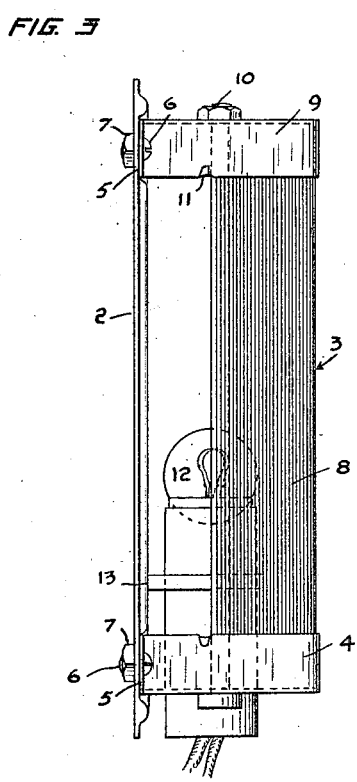
Fig. 3 is a side elevation of the device.
Figure 4:
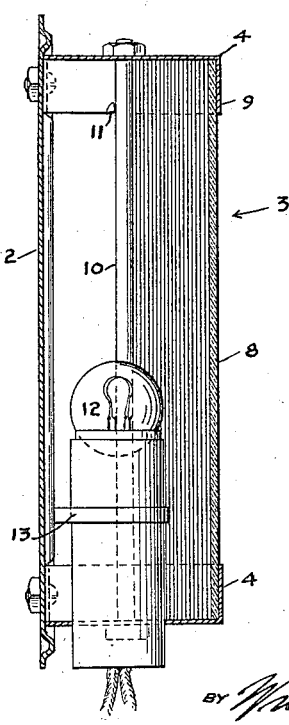
Fig. 4 is a sectional view taken on line 4—4 of Fig. 2.

Referring to the drawings wherein I have illustrated one embodiment of the invention, 1 designates an automobile, 2 the license number plate and 3 the device of my invention as applied to the plate in such manner that it will illuminate the license number and serves as a tail or rear signal as well.

The device of my invention comprises two brackets 4, which are in triangular form and have attaching flanges 5 through which screws 6 are inserted so as to secure the brackets to the license number plate. The screws have nuts 7 turned upon their inner ends to hold the brackets in place. A substantially V shaped glass lens 8 of colored glass, or painted or otherwise stained red, is mounted between the brackets and supported thereby. Depending flanges 9 formed on the brackets engage the outer sides of the glass lens at the ends thereof, in order to hold the glass lens in place. Long bolts or rods 10 are inserted through the brackets and extend longitudinally therebetween along the rear vertical edges of the lens. The lens is thus held between the flanges and rods or bolts and is prevented from moving otherwise, by inturned rear end of the flanges as shown at 11. The rear vertical edges of the lens or lenses are disposed in outwardly spaced relation to the license number plate so as to permit of illumination of the license numbers on the plate by the small incandescent lamp 12 supported on a socket 13 therefor, carried by the lower bracket. Suitable conductors lead to the lamp from a source of electrical current of the automobile.

It will thus be seen that the device of my invention is comparatively small and compact and consists of but few parts, the length or height of the device being less than the width or height of the license number plate and the width of the device being one inch or an inch and a half or greater, it being possible to have the device exceptionally narrow without interfering with the purpose thereof.

My having a V shaped lens formed of one piece of glass, or it may be formed of two pieces of glass, if desired, and located in front of the license number plate and extending vertically for the height of the plate, it is possible to view the signal from points beyond right angles to the direction of travel of the automobile. In negotiating mountain roads and other points where sharp turns are frequently encountered, it is with difficulty that the drivers of machines approaching one another or traveling in the same direction, are able to see the tail lamp or rear light of an automobile since when one automobile is moving in a direction at right angles to another, the red tail lamp will not be visible. With the device of my invention the red lens will be visible from such right angle positions and beyond such positions, thus making it possible for vehicles to keep in touch with one another and eliminating, to a great extent, possibility of accidents. In addition to this, the signal will illuminate the license number plate in an effective manner owing to the arrangement of the incandescent light and the spacing of the light and rear edges of the lens from the license number plate.

Another advantage of the invention is that it will take the place of the ordinary tail lamp and in being attached to the license number bearing portion thereof, will take up very little room but at the same time be located in a conspicuous place and add in a measure to the appearance of the automobile, due to its symmetrical and compact construction.

I claim:

1. A rear light signal for automobiles comprising brackets adapted to be secured to the license number plate of an automobile adjacent the upper and lower edges thereof and which extend rearwardly of said plate, an angular lens disposed between and supported by said brackets at a point rearwardly of the license number plate and illuminating means behind said lens, the rear edges of said lens being spaced outwardly from the number bearing face of the license number plate.

2. A rear light signal for automobiles comprising brackets adapted to be secured to the license number plate of an automobile adjacent the upper and lower edges of the plate, a V shaped lens mounted between and supported by said brackets with the apex portion of the V outwardly disposed and the rear longitudinal edges spaced outwardly from the number bearing face of the license number plate and an incandescent lamp supported by one of said brackets behind said lens.

3. A rear light signal for automobiles comprising brackets adapted to be secured to the license number plate of an automobile adjacent the upper and lower edges of the plate, a V shaped lens mounted between and supported by said brackets with the apex portion of the V outwardly disposed and the rear longitudinal edges spaced outwardly from the number bearing face of the license number plate and an incandescent lamp supported by one of said brackets behind said lens, flanges on said brackets behind which the lens engages and fastening elements extending through said brackets and engaging behind said lens along the rear longitudinal edges thereof.

WILLIAM B. CAUSON.